(12) United States Patent
Vummintala et al.

(10) Patent No.: US 7,586,997 B2
(45) Date of Patent: *Sep. 8, 2009

(54) METHOD AND SYSTEM FOR MAXIMUM TRANSMIT DIVERSITY

(75) Inventors: Shashidhar Vummintala, Santa Clara, CA (US); Arogyaswami Paulraj, Santa Clara, CA (US); Erik D. Lindskog, Santa Clara, CA (US); Balaji S. Rajan, Santa Clara, CA (US); Djordje Tujkovic, Santa Clara, CA (US)

(73) Assignee: Beceem Communications Inc., Santa Clara, CA (US)

( * ) Notice: Subject to any disclaimer, the term of this patent is extended or adjusted under 35 U.S.C. 154(b) by 561 days.

This patent is subject to a terminal disclaimer.

(21) Appl. No.: 11/205,505

(22) Filed: Aug. 16, 2005

(65) Prior Publication Data

US 2006/0034390 A1 Feb. 16, 2006

Related U.S. Application Data

(63) Continuation-in-part of application No. 11/175,621, filed on Jul. 5, 2005, now Pat. No. 7,450,662.

(60) Provisional application No. 60/602,082, filed on Aug. 16, 2004, provisional application No. 60/606,358, filed on Aug. 31, 2004.

(51) Int. Cl.
*H04L 27/00* (2006.01)
(52) U.S. Cl. .................................................. 375/299
(58) Field of Classification Search ................ 375/267, 375/299, 347, 349; 700/53; 455/101, 132–141; 2/267, 299, 347, 349
See application file for complete search history.

(56) References Cited

U.S. PATENT DOCUMENTS

| | | | |
|---|---|---|---|
| 5,479,448 | A | 12/1995 | Seshadri |
| 6,115,427 | A | 9/2000 | Calderbank et al. |
| 6,185,258 | B1 | 2/2001 | Alamouti et al. |
| 6,678,263 | B1 | 1/2004 | Hammons, Jr. et al. |
| 6,751,187 | B2 | 6/2004 | Walton et al. |
| 6,771,620 | B2 | 8/2004 | Butler |
| 6,775,332 | B1 | 8/2004 | Li et al. |
| 7,143,015 | B1 * | 11/2006 | Preuss .......................... 703/2 |
| 2002/0061051 | A1 * | 5/2002 | Kitahara ..................... 375/144 |
| 2002/0105961 | A1 | 8/2002 | Hottinen et al. |
| 2002/0193146 | A1 | 12/2002 | Wallace et al. |

(Continued)

OTHER PUBLICATIONS

X. Lin and R. S. Blum "Improved Space-time codes using Serial Concatenation" IEEE Comm Letters vol. 4, No. 7, Jul. 2000 pp. 221-223.
J. Kim et al., "An Improved Base Station Modulator Design for a CDMA Mobile System"; ETRI Journal, vol. 18, No. 4, Jan. 1997, pp. 215-227.

(Continued)

*Primary Examiner*—Sam K Ahn
(74) *Attorney, Agent, or Firm*—Sawyer Law Group, P.C.

(57) ABSTRACT

A communication system is provided that includes signal encoding in a multiple input multiple output system. The communication system includes wireless communication networks. The communication system includes methods of encoding and transmitting symbols in a rate-1 complex symbol per second per Hertz transmission system while achieving maximum diversity. The communication further includes methods of interleaving the complex symbols such that each interleaved symbol comprises information of at least two complex symbols where the complex symbols obtain values from a rotated constellation.

42 Claims, 4 Drawing Sheets

U.S. PATENT DOCUMENTS

| | | |
|---|---|---|
| 2003/0026349 A1 | 2/2003 | Onggosanusi et al. |
| 2003/0053410 A1 | 3/2003 | Williams et al. |
| 2003/0147343 A1* | 8/2003 | Onggosanusi et al. ....... 370/209 |
| 2004/0047284 A1 | 3/2004 | Eidson |
| 2004/0082356 A1 | 4/2004 | Walton et al. |
| 2004/0179467 A1 | 9/2004 | Seeger et al. |
| 2004/0196919 A1* | 10/2004 | Mehta et al. ................ 375/267 |

OTHER PUBLICATIONS

International Search Report PCT/US05/29302, Apr. 20, 2006.
Written Opinion of the International Searching Authority PCT/US05/29302, Apr. 20, 2006.
International Search Report PCT/US05/29303, Mar. 8, 2006.
Written Opinion of the International Searching Authority PCT/US05/29303, Mar. 8, 2006.

* cited by examiner

METHOD AND SYSTEM FOR MAXIMUM TRANSMIT DIVERSITY

RELATED APPLICATION DATA

This application claims priority to and is a continuation-in-part of U.S. patent application Ser. No. 11/175,621, filed Jul. 5, 2005 now U.S. Pat. No. 7,450,662, and titled "A Method and System for Maximum Transmit Diversity". This application also claims priority to U.S. provisional application No. 60/602,082, filed Aug. 16, 2004, and titled "Communication System and Methods"; and, U.S. provisional application No. 60/606,358, filed Aug. 31, 2004, and titled "Communication System and Methods." This application is related to U.S. patent application Ser. No. 11/175,430, filed Jul. 5, 2005, and titled "A Method and System for Rate-2 Transmission".

FIELD OF THE INVENTION

The invention relates generally to the field of signal encoding in a multiple input multiple output system in a wireless communication network. This invention more specifically relates to a method of encoding and transmitting symbols in a rate-1 complex symbol per second per Hertz transmission system while achieving maximum diversity.

BACKGROUND OF THE INVENTION

Reliability and speed of communications in a wireless network is increasingly crucial to serve growing user demands. This necessitates increasing improvements in technology.

Wireless communications systems can be deployed using a single transmit and a single receive antenna. The wireless channel distorts and adds other impairments to the received signal. These include additive noise, interference, time selective, frequency selective and space selective fading. Fading implies that the signal can be at different level at different antennas, or frequency or time. It is therefore important to transmit and or receive multiple replicas of the signal from multiple dimensions in space, frequency or time to increase the overall link reliability. This approach is known as diversity and is an important technique to assure reliable wireless communication over fading channels. Space diversity is obtained by using multiple antennas in the transmitter and/or in the receiver Typically digital modulation of transmitted data is used. Examples of such modulation schemes include M-ary quadrature amplitude modulation (QAM), M-ary phase shift keying (PSK) etc. Multiple access schemes are also employed to support multiple users. Multiple access schemes include code division multiple access (CDMA), time division multiple access (TDMA), orthogonal frequency division modulation (OFDM) and orthogonal frequency division modulation access (OFDMA). Multiple antenna schemes can be used with any modulation and multiple access scheme. In an OFDM system, the operating frequency band is effectively partitioned into a number of "frequency sub channels", or frequency bins. Each sub channel is associated with one or more sub carriers upon which data is modulated.

The data to be transmitted (i.e., the information bits) are encoded with a chosen coding scheme to generate coded bits. With multiple transmit antennas, coding includes the space dimension along with time or frequency dimensions and is specific to the number of transmit and receive antennas. The encoding scheme determines the diversity that can be captured, the transmission rate and the decode complexity at the receiver. Though different encoding schemes are available in the art, new encoding schemes which enable simpler decoding at the receiver, have good diversity performance and are capable of being used for different multiple transmitter-receiver antennas combinations are desired.

For example, U.S. Pat. No. 6,185,258 discloses the Alamouti code, which is one such simple encoding arrangement scheme in which symbols are transmitted from two transmit antennas over a set of two time slots or frequency sub-channels, with coding that comprises only simple arithmetic operations, such as negation and conjugation. The Alamouti code achieves full transmit diversity. Full transmit diversity is achieved if the diversity contribution from the transmit antennas is equal to the number of transmit antennas. The Alamouti code is a rate one scheme. i.e., it sends on average of one complex symbol per time slot or frequency bin. Use of Alamouti code that codes across two frequency bins instead of two time slots is also known in the art. The number of receive antennas is not specified in the Alamouti code. The code can be used for any number of receive antennas.

However, the Alamouti patent discloses a method of encoding and transmission using only two antennas. Using an Alamouti code over more than two transmit antennas cannot capture the diversity efficiently. Other prior art for more than two transmit antennas use the Alamouti code as a basic ingredient and constellation pre-coding. However, they fail to achieve maximum transmit diversity, and if they do, they are computationally expensive since they do not offer symbol by symbol decoding.

Hence there is a need for an encoding scheme which can be deployed in a wireless communications system with more than 2 transmit antennas and any number of receive antennas, which achieves both maximum transmit diversity with a rate-1 complex symbol per channel use and also offer low complexity symbol by symbol decoding.

BRIEF DESCRIPTION OF THE DRAWINGS

The accompanying drawings when read in conjunction with the description show various embodiments of a method and system for maximum transmit diversity.

FIG. 5($b$) is a rotated QAM constellation, under an embodiment.

DETAILED DESCRIPTION

Figure 1:
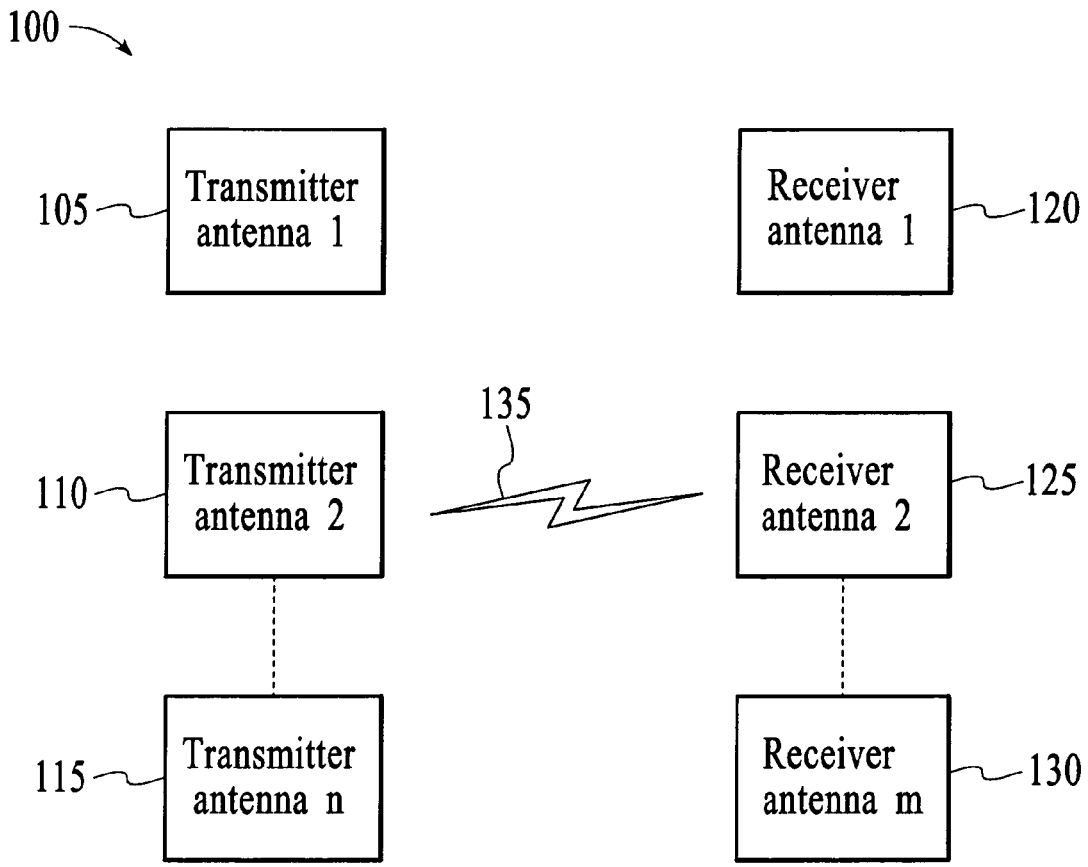
FIG. 1 is a block diagram of a multiple input multiple output ("MIMO") communication system, under an embodiment.

FIG. 1 is a block diagram of a multiple input multiple output ("MIMO") communication system, under an embodiment. The MIMO communication system 100 is a wireless communication system but is not so limited. The MIMO communication system is also referred to herein as a "MIMO system" or "MIMO system 100" but is not so limited. While the MIMO communication system is susceptible of embodiments in many different forms, there are shown in the figures and herein described in detail specific embodiments. It is understood however that the descriptions herein include examples of the principles of the invention and do not limit the MIMO communication system to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements. The MIMO communication system may be embodied in several forms and manners, all of which are not described or shown herein. The invention shall have the full scope of the claims and is not to be limited by the embodiments shown below.

Wireless systems may transmit signals from multiple transmit antennas and receive transmitted signals at multiple receive antennas. Such systems are referred to as MIMO systems. Use of MIMO systems is motivated by factors that include transmit diversity in the link and rate of transmission to name a few. The MIMO systems described herein are not limited and do not depend on the receiver systems and/or receiver system antennas. The MIMO systems of an embodiment can therefore also be used in a single antenna receive systems like multiple input single output ("MISO") systems.

The MIMO systems of an embodiment use one or more signal transmission schemes. A signal undergoes encoding before transmission. Encoding generally dictates the decoding mechanism. Once the encoding process has been completed, the signal is transmitted using the transmit antennas. The MIMO systems of an embodiment include transmission schemes that encode in a rate-1 complex symbol per channel use transmission system, where the encoded symbols can be transmitted over more than two transmit antennas in a manner that achieves full diversity. Regarding the decoding process at the receiver antennas, the MIMO systems of an embodiment allow for symbol-by-symbol or linear decoding at the receiver, which substantially reduces the complexity of the decoding process. Symbol-by-symbol decoding at the receiver end may be a preferred form of decoding since it prevents signal entanglement and hence enables simple and fast decoding. The transmission of the encoded symbols under an embodiment yields maximum diversity.

Referring to FIG. 1, the MIMO system of an embodiment couples to one or more components of a wireless communications channel 135, alternatively referred to as transmission channel 135 or transmission medium 135. The MIMO system of an embodiment includes a number "n" of transmit antennas 105, 110, 115 and a number "m" of receive antennas 120, 125, 130 for use in transmitting or transferring signals over the transmission channel 135. The number n of transmit antennas can include any number of antennas and, likewise, the number m of receive antennas can include any number of antennas. The number of transmit antennas may be the same as or different from the number of receive antennas. The receive antennas may be located on and/or coupled to any wireless receiver residing on a base station and located on any of a radio tower, access point or hub or station, and/or on any wireless enabled client device such as a wireless computer, wireless laptop and/or a hand held device, such as a mobile phone or a personal digital assistant (PDA). The transmit antennas can be on any wireless transmitter residing on a base station and located on a radio tower, access point or hub or station, and/or on any wireless enabled client device such as a wireless computer, wireless laptop or a hand held device, such as a mobile phone or a personal digital assistant (PDA). The data to be transmitted using components of the MIMO system is mapped onto a signal for transmission from the transmit antennas and, upon receipt, interpreted on the receiver, where the receiver decodes information of the received signal to retrieve the original data. The transmitted signal may include video, audio, voice or other forms of data.

In order to encode the signal efficiently, each signal of an embodiment is represented in the form of complex symbols. A complex symbol used in the encoding process comprises a real part and an imaginary part but is not so limited. The degree of redundancy in the encoding process is related to the diversity sought in transmission. This redundancy can be incorporated as space, time or frequency block codes.

Figure 2:
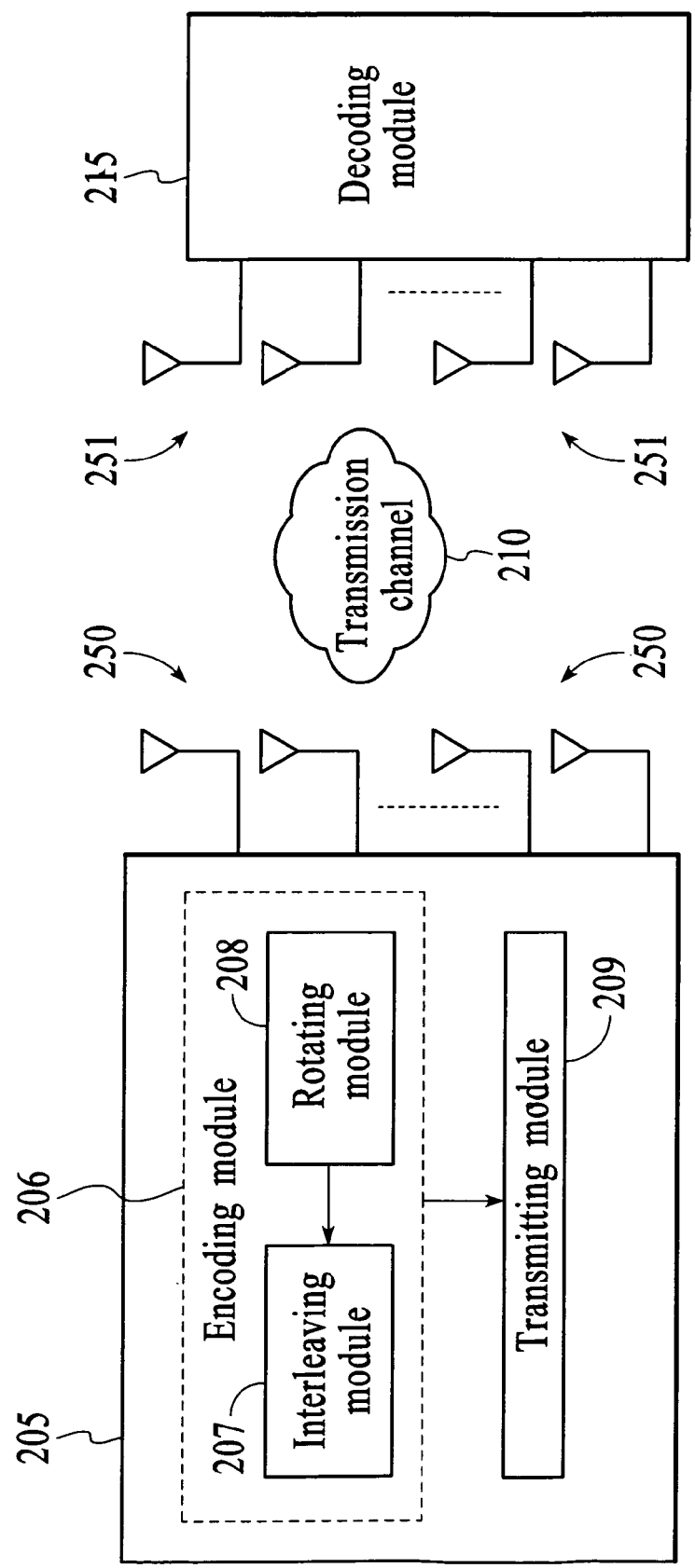
FIG. 2 is a block diagram of an antenna system of the MIMO communication system, under an embodiment.

FIG. 2 is a block diagram of an antenna system 205 of the MIMO system, under an embodiment. The MIMO communication system of an embodiment, which is a wireless communication system, comprises at least one transmitter antenna system 205. The transmitter antenna system 205 of an embodiment includes n transmit antennas 105, 110, 115, as described above with reference to FIG. 1. The transmitter antenna system 205 receives a string of bits for transmission. The string of bits represent the data that is to be transmitted and to undergo encoding before transmission. The transmitter antenna system is coupled to a plurality of transmit antennas to enable a MIMO transmission. In one embodiment, the antenna system 205 comprises three transmit antennas and achieves a diversity of three due to the encoding and transmission techniques, explained below in greater detail. The transmitter antenna system comprises an encoding module 206. The encoding module 206 further comprises a rotating module 208 and an interleaving module 207 coupled for communication with each other. The encoding module encodes the string of bits represented as complex symbols and transfers the encoded bits to the transmitting module 209. Similarly, the receiver system comprises a decoding module 215 coupled to a plurality of receiver antennas in order to receive the encoded bits. The encoded bits on being decoded provide the original data at the receiver.

The transmitter antenna system 205 of an example embodiment is coupled to three transmit antennas 250 which use a rate-1 complex symbol per second per Hertz (four complex symbols) transmission scheme. The bit strings are mapped onto a complex symbol constellation. The generation and mapping of bits onto complex constellations uses a Quadrature Amplitude Modulation (QAM) constellation or a Phase Shift Keying (PSK) constellation for example, but other constellations may be used. The transmitted complex symbols, four complex symbols in a rate-1 scheme, take values from the constellation. The string of bits represents the base band signal which is transmitted over the transmission channel using a carrier frequency. An embodiment of the MIMO system that transmits the four complex symbols (chosen from the constellation) using four transmit antennas is explained later.

The encoding module 206 receives a set of four symbols (Rate-1) which obtain values from a set of symbols representing the constellation. A complex symbol is two-dimensional and can be placed on a number plane defined by a real number axis (horizontal) and an imaginary number axis (vertical). Hence a complex number has a real part and imaginary part written in the form a +jb, where the variable "a" represents the position along the real axis, while the variable "b" represents the position along the imaginary axis. The two-dimensional values relate to the magnitude and phase of an electromagnetic wave traveling through free space. In an embodiment, any two symbols in the constellation have different real parts and different imaginary parts but are not so limited. Therefore, no two symbols in the constellation lie on the same vertical or horizontal line. In the case where the constellation is not represented in this manner, the constellation is rotated by an angle, for example $0.5*\tan^{-1}(2)$, which results in a constellation with the above property. The constellation satisfying the above property is referred to as a rotated constellation. The constellation may not be rotated if the constellation satisfies the above property.

The set of four complex symbols to be transmitted, chosen from the constellation are represented as $x_1, x_2, x_3$ and $x_4$. The symbols are then interleaved. Interleaving is a process in which the real part of a first complex symbol is combined with an imaginary part of a second complex symbol, and the real part of the second complex symbol is combined with the imaginary part of the first complex symbol. For example, using the symbols above, the real part of a complex symbol $x_1$ is combined with an imaginary part of complex symbol $x_3$ and the real part of $x_3$ is combined with the imaginary part of $x_1$. For example, as per one embodiment, the interleaving can be as follows:

$$\tilde{X}_1 = x_{1I} + jx_{3Q}$$

$$\tilde{X}_2 = x_{2I} + jx_{4Q}$$

$$\tilde{X}_3 = x_{3I} + jx_{1Q}$$

$$\tilde{X}_4 = x_{4I} + jx_{2Q}$$

where $\tilde{X}_1, \tilde{X}_2, \tilde{X}_3, \tilde{X}_4$ are the set of four interleaved symbols corresponding to the set of four complex symbols, $x_i = x_{iI} + jx_{iQ}$, $I=1, 2, 3, 4 \ldots$ and $j=\sqrt{-1}$. The interleaving module 207 combines the symbols in a manner where each interleaved symbol comprises information of two symbols from the set of the four symbols.

The encoding module 206 transfers the set of four interleaved symbols to a transmitting module 209 for transmitting. The transmitting module 209 transmits the set of four interleaved symbols using the three transmit antennas. The interleaved symbols of an embodiment are arranged in a matrix format, where each row of the matrix represents a transmitter antenna, and the symbols are transmitted using the transmitter antenna. As stated previously, the set of four interleaved symbols are subjected to a process which creates a complex conjugate and a negative complex conjugate of each interleaved symbol to incorporate redundancy during transmission. Redundantly transmitting a selected few of the set of four interleaved symbols in different forms, such as a complex conjugate and a negative complex conjugate of the interleaved symbols provides additional support to the decoding module to retrieve the original data accurately in cases where symbol information is lost in the transmission channel 210 due to the presence of noise or channel fading.

In an embodiment, two transmit antennas of the three transmit antennas 250 transmit a predetermined combination of a first two interleaved symbols, a complex conjugate of the first two interleaved symbols and a negative complex conjugate of the first two interleaved symbols from the set of four interleaved symbols over a first transmission channel of the transmitter channel 210 (individual transmission channels not shown). The transmit antennas also transmit a predetermined combination of a second two interleaved symbols, a complex conjugate of the second two interleaved symbols and a negative complex conjugate of the second two interleaved symbols from the set of four interleaved symbols in a manner over a second transmission channel of the transmitter channel 210. The transmission ensures that each transmitter antenna of the three transmitter antennas transmits information (real part and/or imaginary part) about each symbol from the set of four symbols over two transmission channels of the transmitter channel 210. Some transmit antennas may transmit nothing or zero's instead of interleaved symbols such that the transmission matrix retains an orthogonal property.

The arrangement of the interleaved symbols is such that two sets of Alamouti codes are interleaved with each other and transmitted over two transmission channels using three or four antennas. The Alamouti encoding scheme to create Alamouti codes and the arrangement of the Alamouti codes is known in the art. The arrangement pursuant to the embodiment disclosed above, depicting antennas that transmit interleaved symbols and antennas that transmit zeros over a specific transmission channels is explained in greater detail in FIG. 3

A transmission channel of the transmitter channel 210 includes a frequency sub-carrier over which the symbols are transmitted. The transmitter channel 210 may include any number of transmission channels as appropriate to the MIMO communication system. Since the interleaving module 207 ensures that each interleaved symbol comprises information of two complex symbols, the transmitter antenna while transmitting each interleaved symbol is transmitting information of two complex symbols. The interleaving process also enhances diversity. Additionally, since each complex symbol has already been rotated and has a different real and imaginary part (i.e. a real part of one symbol is not the same as a real part of another symbol, or the imaginary part of one symbol is not the same as the imaginary part of another symbol) the decoding module can retrieve the original symbol by de-interleaving the interleaved symbols during the decoding process. The interleaved symbols can be transmitted based on various permutations as long as each transmitter antenna transmits information of each symbol from the set of four symbols in a rate-1 transmission scheme.

In the case of a four antenna transmit system the transmission ensures that each transmitter antenna of the four transmitter antennas transmits information (real part or imaginary part) about each symbol from the set of four symbols over two transmission channels of the transmitter channel 210.

Figure 3:
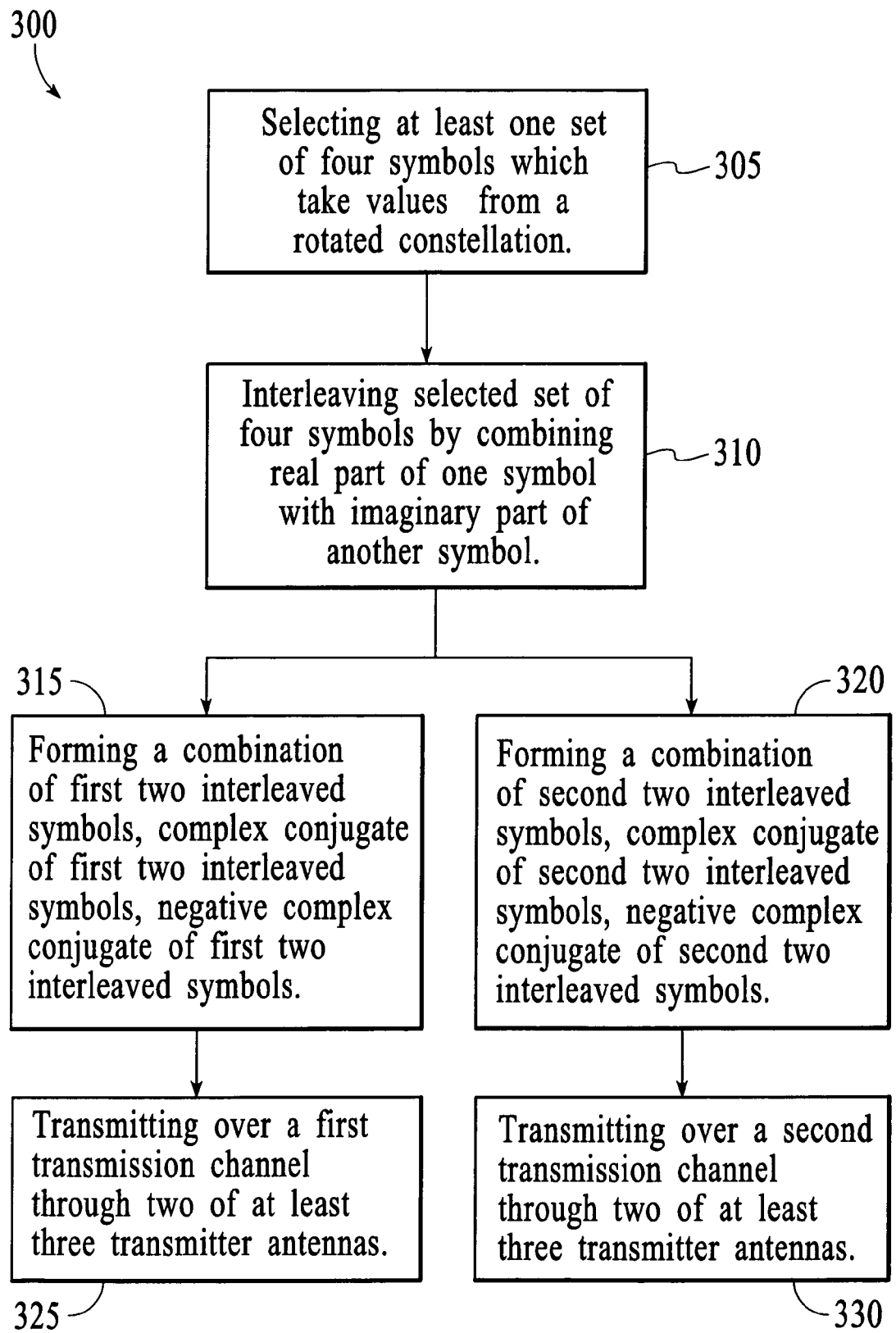
FIG. 3 is a flow diagram for encoding an input signal set in the MIMO communication system, under an embodiment.

FIG. 3 is a flow diagram for encoding and transmitting 300 the set of four symbols of an input signal set, under an embodiment. The components of the antenna system 205 (FIG. 2) execute or control the encoding and transmitting 300 in an embodiment. The MIMO system of an embodiment maps a string of bits onto the constellation. Components of the MIMO system select 305 at least one set of four symbols, which obtain values from the constellation (the constellation may be rotated). The same value can be obtained for all four symbols from the set of four symbols. Alternatively, different values can be obtained for each symbol, and/or a combination of the same values and different values can be obtained for each symbol. Each symbol in the constellation has a different representation compared to the other symbol. If the representation of the symbols is the same (the real and imaginary part of at least one symbol is the same as the real and imaginary part of another symbol) the symbol is rotated such that it does not have the same representation as the other symbol. An example angle for rotation is $0.5*\tan^{-1}2$ but the embodiment is not so limited.

Assuming for an example that the set of four symbols are represented as $x_1, x_2, x_3, x_4$, then $x_1, x_2, x_3, x_4$ can be the same symbol (having the same values), or different symbols (having different values). In an embodiment, $x_1$, $x_2$, $x_3$, $x_4$ are different symbols having different values chosen from a rotated constellation. The set of four symbols are then interleaved 310. The interleaving 310 of the symbols ensures that each interleaved symbol comprises information of two symbols from the set of four symbols. This helps to provide maximum diversity during transmission. In an embodiment, the interleaving process combines the real part of one symbol with the imaginary part of another symbol. The result is that each interleaved signal includes a real part of one signal and an imaginary part of another signal. For the set of symbols $x_1$, $x_2$, $x_3$, $x_4$, the interleaving process can be done in several ways. For example, $$\tilde{X}_1 = x_{1I} + jx_{3Q}$$

$$\tilde{X}_2 = x_{2I} + jx_{4Q}$$

$$\tilde{X}_3 = x_{3I} + jX_{1Q}$$

$$\tilde{X}_4 = x_{4I} + jx_{2Q}$$

where $\tilde{X}_1$, $\tilde{X}_2$, $\tilde{X}_3$, $\tilde{X}_4$ are the set of four interleaved symbols corresponding to the set of four complex symbols, $x_i = x_{iI} + jx_{iQ}$, $I = 1, 2, 3, 4 \ldots$ and $j = \sqrt{-1}$. The interleaved symbols $\tilde{X}_1$, $\tilde{X}_2$, $\tilde{X}_3$, $\tilde{X}_4$ can be interleaved in several different ways and all such ways are within the scope of the MIMO system described herein.

For example, $$\tilde{X}_1 = x_{1I} + jx_{4Q}$$

$$\tilde{X}_2 = x_{2I} + x_{3Q}$$

$$\tilde{X}_3 = x_{3I} + jx_{2Q}$$

$$\tilde{X}_4 = x_{4I} + jx_{1Q}$$

In order to incorporate redundancy during transmission to account for the loss due to transmission channel fading, noise, interference and/or any other form of loss of signal, each interleaved symbol is replicated in the form of a complex conjugate and a negative complex conjugate. Performing a complex conjugate and a negative complex conjugate changes the sign of a certain term in the complex symbol and can be used to get additional information of the complex symbol in the event of a loss of signal in the transmission channel. For example, if the interleaved symbol $\tilde{X}_2$ which comprises information of complex symbols $x_2$ and $x_4$ suffers interference, the complex conjugate of $\tilde{X}_2$ represented as $\tilde{X}_2^*$ can aid in retrieving information of the original symbol.

Once the complex symbols have been interleaved, in one embodiment, they are arranged in a matrix where each row of the matrix corresponds to a transmitter antenna. Pursuant to one embodiment, the matrix can be represented as follows for a three transmit antenna system. This matrix is presented to depict a representation for transmission of the interleaved symbols and any structure that enables transmission in the manner described herein can be used and is within the scope of the MIMO systems of an embodiment.

| $\tilde{X}1$ | $-(\tilde{X}2)*$ | 0 | 0 |
|---|---|---|---|
| $\tilde{X}2$ | $(\tilde{X}1)*$ | $\tilde{X}3$ | $-(\tilde{X}4)*$ |
| 0 | 0 | $\tilde{X}4$ | $(\tilde{X}3)*$ |

Each row of the matrix represents a transmitter antenna, the first two columns of the matrix represent a first transmission sub-carrier (at a specified frequency for transmission), and the last two columns of the matrix represent a second transmission sub-carrier channel. The interleaved symbols in the first column and the third column are transmitted at the first time and the interleaved symbols in the second column and the fourth column are transmitted at the second time in an embodiment. However, the interleaved symbols from the first two columns are transmitted over a first transmission sub-carrier channel and the interleaved symbols from the last two columns are transmitted over a second sub-carrier transmission channel. The encoding incorporates a time, space and frequency division multiplexing simultaneously but is not so limited.

In the matrix described above, notice that the second antenna (second row of the matrix) is transmitting signals over both the sub-carrier channels while the first and third transmit antennas (first and third rows of the matrix, respectively) are not transmitting signals over both the sub-carrier channels. This would lead to higher power loading on the second transmit antenna. To avoid higher power loading the following transmission matrix can be used.

| $\tilde{X}1$ | $-(\tilde{X}2)*$ | 0 | 0 |
|---|---|---|---|
| $\tilde{X}2$ | $(\tilde{X}1)*$ | 0 | 0 |
| 0 | 0 | $\tilde{X}3$ | $\tilde{X}4$ |

This arrangement may not however provide maximum diversity. If the sub-carrier channels at the two frequencies are completely dependent, the diversity achieved by the code is the maximum possible diversity which is three. In the case where the two sub-carrier channels at the two frequencies are not completely dependent, the maximum possible diversity is four, which may not be achieved by the code. To improve the performance in the latter case, the transmission in the third antenna could be weighted with higher power than that of the first and second antennas. An example of such a weighting is done by multiplying the code with the following matrix from the left.

$$\begin{bmatrix} \sqrt{3/4} & 0 & 0 \\ 0 & \sqrt{3/4} & 0 \\ 0 & 0 & \sqrt{3/2} \end{bmatrix}$$

A combination of a first two interleaved symbols, a complex conjugate of the first two interleaved symbols and a negative complex conjugate of the first two interleaved symbols from the set of four interleaved symbols are generated or formed 315 by components of the MIMO system. The generated combinations are transmitted 325, using two transmit antennas of the three transmit antennas, over a first transmission channel.

Further, a combination of a second two interleaved symbols, a complex conjugate of the second two interleaved symbols and a negative complex conjugate of the second two interleaved symbols from the set of four interleaved symbols are generated or formed 320 by components of the MIMO system. The generated combinations are transmitted 330, using two transmit antennas of the three transmit antennas, over a second transmission sub-carrier channel.

For example, in the embodiment of the matrix provided above, the first antenna transmits interleaved symbol $\tilde{X}_1$ and a negative complex conjugate of $\tilde{X}_2$ represented as $-(\tilde{X}_2)*$ on the first transmission sub-carrier channel and zeros on the second transmission sub-carrier channel. Hence, $\tilde{\ }X_1$ comprises information of complex symbol $x_1$ and complex symbol $x_3$ while $-(\tilde{\ }X_2)^*$ comprises information of complex symbol $x_2$ and complex symbol $x_4$. The transmission of zeros under the transmission channels disclosed enables symbol-by-symbol decoding, thereby substantially reducing the complexity. The second transmit antenna transmits interleaved symbol $\tilde{\ }X_2$ and complex conjugate of interleaved symbol $\tilde{\ }X_1$ on the first transmission sub-carrier channel and interleaved symbol $\tilde{\ }X_3$ and a negative complex conjugate of $\tilde{\ }X_4$ represented as $-(\tilde{\ }X_4)^*$ on the second transmission sub-carrier channel. The arrangement of the interleaved symbols for transmission is such that the interleaved symbols of the first row and the interleaved symbols of the second row, being transmitted over the first transmission sub-carrier channel retain an orthogonal property which enables a faster decoding at the receiver end. Similar to the first transmit antenna, the set of four interleaved symbols transmitted using the second transmit antenna also comprise information of each complex symbol and in addition incorporate redundancy with the transmission of complex conjugates and negative complex conjugates of the interleaved symbols. The third transmit antenna transmits zeros over the first transmission sub-carrier and interleaved symbol $\tilde{\ }X_4$ and a complex conjugate of $\tilde{\ }X_3$ represented as $(\tilde{\ }X_3)^*$ over the second transmission sub-carrier. Again, the zeros transmitted on the first transmission channel enable symbol-by-symbol decoding. The arrangement of the interleaved symbols in the matrix is such that the matrix comprises two Alamouti codes that are interleaved with each other. The Alamouti encoding scheme to create Alamouti codes and the arrangement of the Alamouti code is known in the art.

During the decoding process, at each receiver antenna 251 is present the received complex symbol $Y_i(j)$ at the $i^{th}$ time and $j^{th}$ subcarrier or transmission sub-carrier channel as:

$$Y(1) = [Y_1(1) \; Y_2(1)]$$
$$= [h_1(1) \; h_2(1) \; h_3(1)] \begin{bmatrix} \tilde{\ }X_1 & -\tilde{\ }(X_2)* \\ \tilde{\ }X_2 & \tilde{\ }(X_1)* \\ 0 & 0 \end{bmatrix} + [n_1(1) \; n_2(1)]$$

$$Y(2) = [Y_1(2) \; Y_2(2)]$$
$$= [h_1(2) \; h_2(2) \; h_3(2)] \begin{bmatrix} 0_1 & 0 \\ \tilde{\ }X_3 & -\tilde{\ }(X_4)* \\ \tilde{\ }(X_4) & \tilde{\ }(X_3)* \end{bmatrix} + [n_1(2) \; n_2(2)]$$

where $n_i(j)$ represents the noise in the transmission channel. The matrix H can be formed as $$\begin{bmatrix} Y_1(1) \\ Y_2(1)* \\ Y_1(2) \\ Y_2(2)* \end{bmatrix} = \underbrace{\begin{bmatrix} h_1(1) & h_2(1) & 0 & 0 \\ h_2(1)* & -h_1(1)* & 0 & 0 \\ 0 & 0 & h_2(2) & h_3(2) \\ 0 & 0 & h_3(2)* & -h_2(2)* \end{bmatrix}}_{H} \begin{bmatrix} \tilde{\ }X1 \\ \tilde{\ }X2 \\ \tilde{\ }X3 \\ \tilde{\ }X4 \end{bmatrix} + \begin{bmatrix} n_1(1) \\ n_2(1)* \\ n_1(2) \\ n_2(2)* \end{bmatrix}$$

The matrix H represents the equivalent channel matrix which is an orthogonal matrix. Multiplying both sides of the above equation with complex conjugate transpose of H provides, $$Y'_1 = (|h_1(1)|^2 + |h_2(1)|^2)\tilde{\ }X_1 + n'_1$$

$$Y'_2 = (|h_1(1)|^2 + |h_2(1)|^2)\tilde{\ }X_2 + n'_2$$

$$Y'_3 = (|h_2(2)|^2 + |h_3(2)|^2)\tilde{\ }X_3 + n'_3$$

$$Y'_4 = (|h_2(2)|^2 + |h_3(2)|^2)\tilde{\ }X_4 + n'_4$$

De-interleaving the real and imaginary parts of $Y'_i$s provides:

$$Y''_1 = x_1 + n''_1$$

$$Y''_2 = x_2 + n''_2$$

$$Y'''_3 = x_3 + n''_3$$

$$Y''_4 = x_4 + n''_4$$

Hence, from the embodiment described above the complex symbols can be decoded symbol-by-symbol and the diversity gain is equal to four for three transmit antennas and four for four transmit antennas if the transmission channels are statistically independent.

In a MIMO system of an embodiment that uses four transmit antennas, the arrangement of the matrix will be as follows, where each row of the matrix represents a transmit antenna.

| $\tilde{\ }X1$ | $\tilde{\ }-(X2)*$ | 0 | 0 |
|---|---|---|---|
| $\tilde{\ }X2$ | $\tilde{\ }(X1)*$ | 0 | 0 |
| 0 | 0 | $\tilde{\ }X3$ | $\tilde{\ }-(X4)*$ |
| 0 | 0 | $\tilde{\ }X4$ | $\tilde{\ }(X3)*$ |

Each transmit antenna transmits information of all symbols over two transmission channels. The method of encoding and transmission described above is similar to the one described for three transmit antennas. However, the diversity of a four transmit antenna system using the encoding method described above is maximum i.e. four. The set of four interleaved symbols can be replaced by other interleaved symbols in any manner such that each transmitter antenna transmits information of all four symbols while incorporating redundancy. The transmission of zeros under the transmission channels disclosed enables symbol-by-symbol decoding.

Each transmit antenna transmit signals in two time uses over two sub-carrier channel at different frequencies (e.g., the first and second transmit antennas transmit signals over one sub-carrier channel while the third and fourth transmit antennas transmit signals over another sub-carrier channel. This may produce a Peak-to-Average Power ratio (PAPR) which can be reduced by multiplying the transmission matrix from the left by the following matrix W:

$$\underbrace{\frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix}}_{W}$$

The matrix W is known as the 4 by 4 Hadamard matrix. The resulting transmission will have a reduced PAPR.

Figure 4:
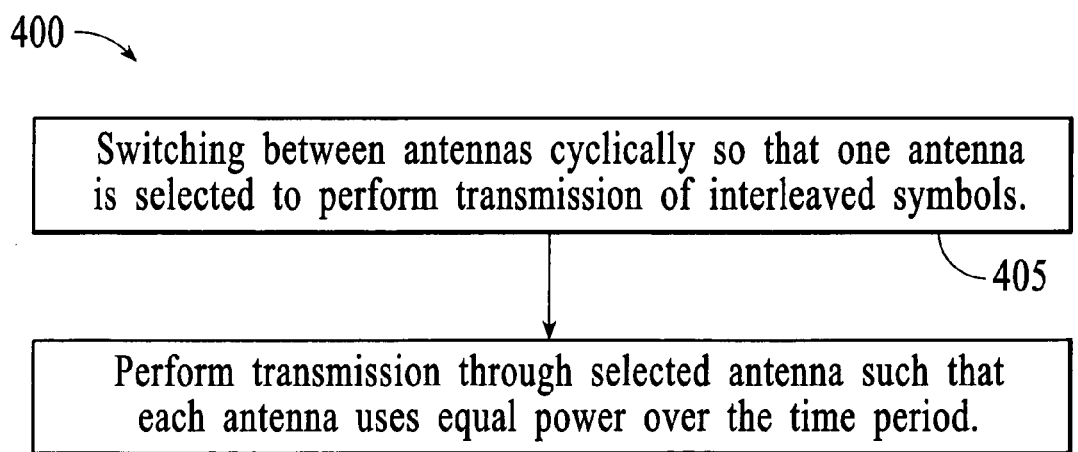
FIG. 4 is a flow diagram for uniform antenna loading in the MIMO communication system, under an embodiment.

FIG. 4 is a flow diagram for uniform antenna loading 400 (approximately equal sharing of power across antennas) in the MIMO system, under an embodiment. The components of the antenna system 205 (FIG. 2) execute or control the antenna loading 400 in an embodiment. During the transmission of interleaved symbols, components of the MIMO system switch 405 between transmit antennas. Transmission 410 occurs through the antennas so that each antenna consumes equal power over the time period. In one embodiment, the switching can be cyclical but is not so limited. For example, in the case of the three transmit antenna matrix disclosed above, the second antenna transmits four interleaved symbols while the first and third transmit antennas transmit only two interleaved symbols over two transmission channels.

| ⁻X2 | ⁻(X1)* | ⁻X3 | ⁻-(X4)* |
|---|---|---|---|
| ⁻X1 | ⁻-(X2)* | 0 | 0 |
| 0 | 0 | ⁻X4 | ⁻(X3)* |

In an alternative embodiment, the antennas can be switched where in a subsequent time period the first transmit antenna transmits four interleaved symbols and the other two transmit antennas transmit two interleaved symbols as shown above. Switching between the antennas enables the power and load of each antenna to be distributed approximately uniformly over time.

Figure 5A:
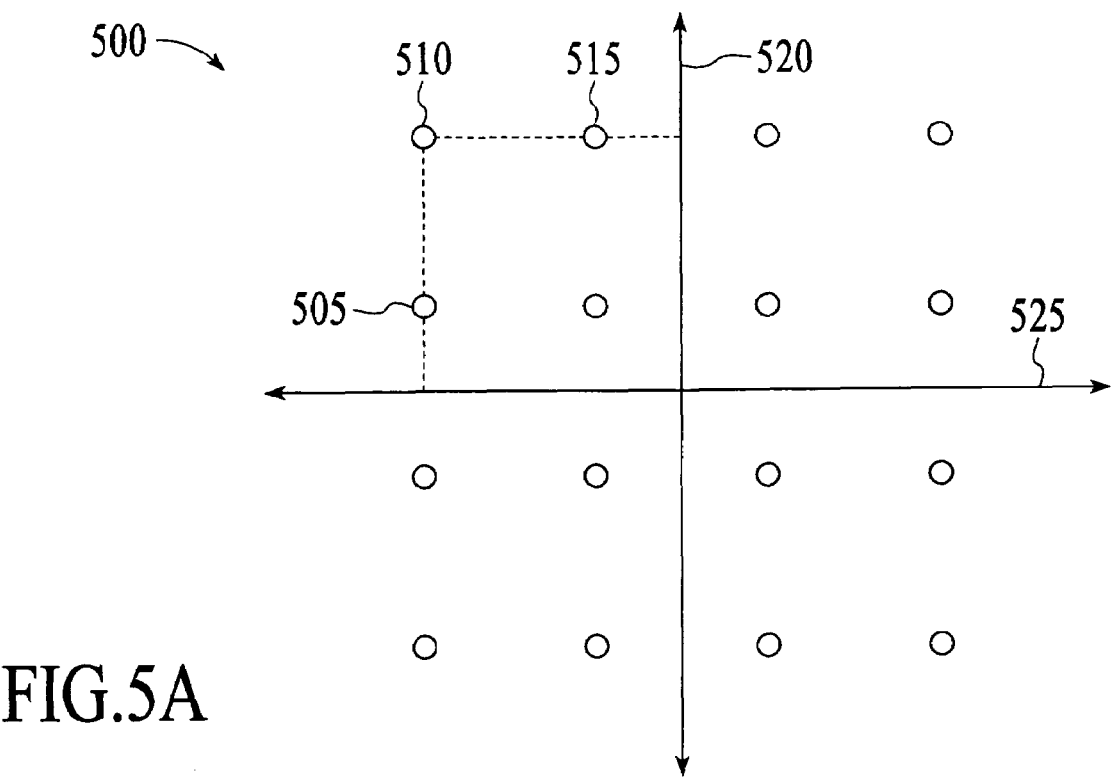
FIG. 5($a$) is a regular quadrature amplitude modulation ("QAM") constellation, under an embodiment.

FIG. 5(a) is a regular QAM constellation 500, under an embodiment. Some symbols from the set of symbols being represented by signal points have the same real or imaginary part as another symbol from the set of symbols. The horizontal axis 525 represents the real axis and the vertical axis 520 represents the imaginary axis. For example, complex symbol 505 has the same real part as complex symbol 510 and complex symbol 510 has the same imaginary part as complex symbol 515.

Figure 5B:
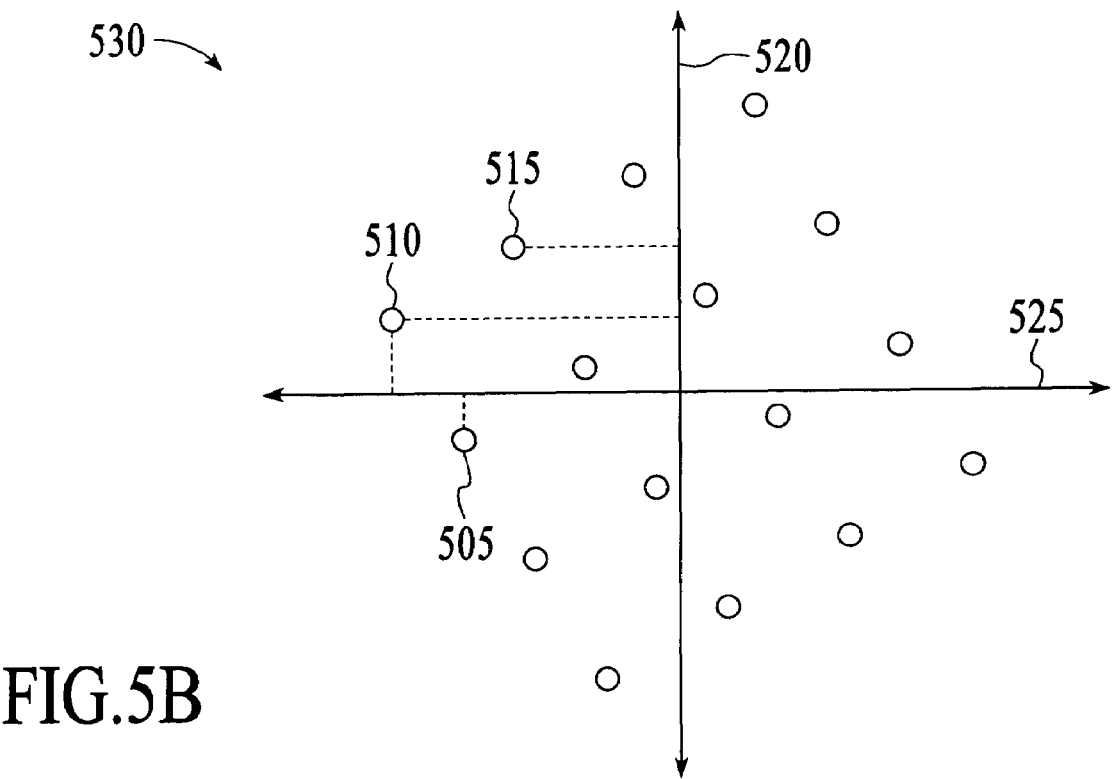

FIG. 5(b) is a rotated QAM constellation 530, under an embodiment., The rotated constellation 530 of this example rotates the regular QAM constellation 500 by a predetermined angle, for example $0.5*\tan^{-1}(2)$, to obtain the rotated constellation 530. Alternative embodiments may rotate the regular QAM constellation 500 by any amount. The rotated constellation 530 comprises points such that no two symbols from the set of symbols have the same real or imaginary part as another symbol. For example, complex symbol 505, after rotation has a different real part than the complex symbol 510 and a different real part than all complex symbols of the constellation and complex symbol 510, after rotation has a different imaginary part than complex symbol 515 and different imaginary part than all complex symbols of the constellation. The real part of one complex symbol can be the same as the imaginary part of another complex symbol.

The MIMO communication system described herein includes a method comprising at least one of selecting a set of four symbols from a set of symbols that represent data, encoding a set of four interleaved symbols that represent the set of four symbols, each interleaved symbol from the set of four interleaved symbols being generated by combining a first part of one symbol with a second part of one other symbol, and transmitting the set of four interleaved symbols using a plurality of transmit antennas, wherein two transmit antennas of the plurality of transmit antennas transmit a first combination of information of the set of four interleaved symbols over a first transmission sub-carrier channel and a second combination of the set of four interleaved symbols over a second transmission sub-carrier channel, wherein each transmitter antenna of the plurality of transmitter antennas transmits over at least two transmission channels information of each symbol of the set of four symbols.

The first combination of information of an embodiment includes a combination of a first two interleaved symbols, a complex conjugate of the first two interleaved symbols and a negative complex conjugate of the first two interleaved symbols from the set of four interleaved symbols.

The second combination of information of an embodiment includes a combination of a second two interleaved symbols, a complex conjugate of the second two interleaved symbols and a negative complex conjugate of the second two interleaved symbols from the set of four interleaved symbols.

The set of four symbols of an embodiment comprises the symbol and the one other symbol.

Each symbol from the set of symbols of an embodiment takes values from a rotated constellation. The method of an embodiment further comprises at least one of generating a constellation that includes the data, and generating the rotated constellation by rotating the constellation when at least one of a real and an imaginary part of one symbol of the constellation has at least one same real and an imaginary part as another symbol of the constellation. The rotating of an embodiment includes rotating the constellation approximately $0.5*\tan^{-1}(2)$.

The method of an embodiment further comprises incorporating redundancy in the set of four interleaved symbols using a conjugate of an interleaved symbol from the set of four interleaved symbols.

The method of an embodiment further comprises incorporating redundancy in the set of four interleaved symbols by forming a negative complex conjugate of an interleaved symbol for each interleaved symbol from the set of four interleaved symbols.

The transmitting of an embodiment further comprises switching between the transmitter antennas in a cyclic manner such that each transmit antenna transmits a substantially equal number of interleaved symbols over at least one time period, wherein each transmitter antenna uses a substantially equal amount of power over the time period.

The method of an embodiment further comprises decoding the plurality of interleaved symbols at a receiver using symbol-by-symbol decoding.

The MIMO communication system described herein includes an apparatus for transmitting, the apparatus comprising at least one of an encoder configured to receive a set of four interleaved symbols corresponding to a set of four symbols that represent data, a module coupled to the encoder and configured to arrange the set of four interleaved symbols in a matrix, and a transmitter coupled to the encoder and the module, wherein contents of the matrix control transmission of the data by transmitting the set of four interleaved symbols using a plurality of transmit antennas, wherein two transmit antennas of the plurality of transmit antennas transmit a first combination of information of the set of four interleaved symbols over a first transmission sub-carrier channel and a second combination of the set of four interleaved symbols over a second transmission sub-carrier channel, wherein each transmitter antenna of the plurality of transmitter antennas transmits over at least two transmission channels information of each symbol of the set of four symbols.

Each interleaved symbol of the set of four interleaved symbols of an embodiment is generated by combining a first part of a first symbol with a second part of a second symbol, a replication of a conjugate of each interleaved symbol and a negative complex conjugate of each interleaved symbol. The set of four symbols of an embodiment includes the first and second symbols.

The matrix of an embodiment includes at least three rows and four columns, each row of the matrix corresponding to a transmitter antenna.

The matrix of an embodiment comprises at least one of a first row with a first two interleaved symbols from the set of four interleaved symbols in a first two columns of the matrix and zeros in a last two columns of the matrix, a second row with a complex conjugate and a negative complex conjugate of the first two interleaved symbols from the set of four interleaved symbols in the first two columns of the matrix and second two interleaved symbols from the set of four interleaved symbols in the last two columns of the matrix, and a third row with zero in the first two columns of the matrix and a complex conjugate and a negative complex conjugate of the second two interleaved symbols in the second two columns of the matrix, the first two columns representing the first transmission sub-carrier channel and the last two columns representing the second transmission sub-carrier channel.

The set of four symbols of an embodiment includes values from at least one constellation. The apparatus of an embodiment further comprises rotating the constellation to form a rotated constellation when at least one of a real and an imaginary part of one symbol from the constellation is the same as at least one of a real and imaginary part of another symbol in the constellation.

The matrix comprises of an embodiment comprises at least one of a first row with a first two interleaved symbols from the set of four interleaved symbols in a first two columns of the matrix and zeros in a last two columns of the matrix, a second row with a complex conjugate and a negative complex conjugate of the first two interleaved symbols from the set of four interleaved symbols in the first two columns of the matrix and zeroes in the last two columns of the matrix, and a third row with zero in the first two columns of the matrix and third and fourth interleaved symbols in the second two columns of the matrix, the first two columns of the matrix representing the first transmission sub-carrier channel and the last two columns of the matrix representing the second transmission sub-carrier channel.

The transmitter of an embodiment controls transmission using a power weighting on the plurality of transmit antennas, wherein the power weighting provides relatively higher power on a third antenna compared to a first two antennas. The matrix of an embodiment further comprises a fourth row representing a fourth transmitter antenna being used in a predetermined manner to transmit the set of four interleaved symbols.

The set of four interleaved symbols of an embodiment can be decoded at a receiver using a symbol-by-symbol decoding technique.

The first part of an embodiment is a real part of the symbol and the second part is an imaginary part of the other symbol.

The orthogonal scrambling matrix of an embodiment is used to mix output symbols to the plurality of antennas, wherein a peak-to-average ratio of signals is reduced at the plurality of antennas. The orthogonal scrambling matrix of an embodiment is a 4×4 Hadamard matrix.

The MIMO communication system described herein includes a system comprising at least one of an encoding module configured to receive at least one set of four symbols from a set of symbols, an interleaving module coupled to the encoding module and configured to interleave each symbol from the set of four symbols with a corresponding combining symbol to obtain a set of four interleaved symbols corresponding to the set of four symbols, and a transmitter coupled to the encoding module and the interleaving module and configured to transmit the set of four interleaved symbols using a plurality of transmit antennas, wherein at least two transmit antennas of the plurality of transmit antennas transmit a first combination of information of the set of four interleaved symbols over a first transmission channel and a second combination of information of the set of four interleaved symbols over a second transmission channel, wherein each transmitter antenna of the plurality of transmitter antennas transmitting over at least two transmission channels information of each symbol of the set of four symbols.

The first combination of information of an embodiment includes a combination of a first two interleaved symbols, a complex conjugate of the first two interleaved symbols and a negative complex conjugate of the first two interleaved symbols from the set of four interleaved symbols.

The second combination of information of an embodiment includes a combination of a second two interleaved symbols, a complex conjugate of the second two interleaved symbols and a negative complex conjugate of the second two interleaved symbols from the set of four interleaved symbols.

Each symbol of the set of symbols of an embodiment is represented in a different manner from each other symbol of the set of symbols.

Each interleaved symbol from the set of four interleaved symbols of an embodiment comprises information of the symbol and the corresponding combining symbol, wherein the set of four symbols includes the symbol and the corresponding combining symbol.

The system of an embodiment further comprises a rotating module that rotates a constellation by a predetermined angle when at least one of a real and imaginary part of one symbol from the constellation is equal to at least one of a real and imaginary part of another symbol form the constellation.

The encoding module and the transmitting module of an embodiment are integrated as a single module. The single module of an embodiment can be a component of at least one of a base station and a subscriber station. The single module of an embodiment is a processor-based module.

The encoding module and the transmitting module of an embodiment are configured to transmit the set of four interleaved symbols using an additional transmitter antenna in a predetermined manner.

The at least one set of four symbols of an embodiment are transmitted over a wireless medium.

The set of four interleaved symbols of an embodiment are transmitted by switching between the plurality of transmitter antennas in a cyclic manner such that each transmit antenna transmits a substantially equal number of interleaved symbols over at least one time period, each transmitter antenna using a substantially equal amount of power over the time period.

The MIMO communication system of an embodiment addresses an encoding and transmission method using three or four antennas. To retain maximum diversity and enable symbol-by-symbol decoding, any transmit antenna in addition to four would need to transmit zeros over both transmission channels.

Each publication and patent application mentioned in this specification is herein incorporated by reference in its entirety to the same extent as if each individual publication or patent application was specifically and individually indicated to be incorporated by reference.

Aspects of the MIMO communication system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the MIMO communication system include: microcontrollers with memory (such as electronically erasable programmable read only memory (EEPROM)), embedded microprocessors, firmware, software, etc. Furthermore, aspects of the MIMO communication system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the MIMO communication system is not intended to be exhaustive or to limit the systems and methods to the precise form disclosed. While specific embodiments of, and examples for, the MIMO communication system are described herein for illustrative purposes, various equivalent modifications are possible within the scope of other systems and methods, as those skilled in the relevant art will recognize. The teachings of the MIMO communication system provided herein can be applied to other processing systems and methods, not only for the systems and methods described above.

The elements and acts of the various embodiments described above can be combined to provide further embodiments. These and other changes can be made to the MIMO communication system in light of the above detailed description.

What is claimed is:

1. A method comprising:
selecting a set of four symbols from a set of symbols that represent data;
encoding a set of four interleaved symbols that represent the set of four symbols, each interleaved symbol from the set of four interleaved symbols being generated by combining a first part of one symbol with a second part of one other symbol; and
transmitting the encoded set of four interleaved symbols using a plurality of transmit antennas, wherein two transmit antennas of the plurality of transmit antennas transmit a first combination of the set of four interleaved symbols over a first transmission sub-carrier channel and a second combination of the set of four interleaved symbols over a second transmission sub-carrier channel, wherein each transmitter antenna of the plurality of transmitter antennas transmits over at least two transmission channels; wherein
the set of four symbols includes values from at least one constellation; and
further comprising rotating the constellation to form a rotated constellation when at least one of a real and an imaginary part of one symbol from the constellation is the same as at least one of a real and imaginary part of another symbol in the constellation.

2. The method of claim 1, wherein the first combination of information includes a combination of a first two interleaved symbols, a complex conjugate of the first two interleaved symbols and a negative complex conjugate of the first two interleaved symbols from the set of four interleaved symbols.

3. The method of claim 1, wherein the second combination of information includes a combination of a second two interleaved symbols, a complex conjugate of the second two interleaved symbols and a negative complex conjugate of the second two interleaved symbols from the set of four interleaved symbols.

4. The method of claim 1, wherein the set of four symbols comprises the symbol and the one other symbol.

5. The method of claim 1, wherein each symbol from the set of symbols takes values from a rotated constellation.

6. The method of claim 5, further comprising:
generating a constellation that includes the data; and
generating the rotated constellation by rotating the constellation when at least one of a real and an imaginary part of one symbol of the constellation has at least one same real and an imaginary part as another symbol of the constellation.

7. The method of claim 6, wherein the rotating includes rotating the constellation approximately $0.5*\tan^{-1}(2)$.

8. The method of claim 1, further comprising incorporating redundancy in the set of four interleaved symbols using a conjugate of an interleaved symbol from the set of four interleaved symbols.

9. The method of claim 1, further comprising incorporating redundancy in the set of four interleaved symbols by forming a negative complex conjugate of an interleaved symbol for each interleaved symbol from the set of four interleaved symbols.

10. The method of claim 1, wherein transmitting further comprises switching between the transmitter antennas in a cyclic manner such that each transmit antenna transmits a substantially equal number of interleaved symbols over at least one time period, wherein each transmitter antenna uses a substantially equal amount of power over the time period.

11. The method of claim 1, further comprising decoding the plurality of interleaved symbols at a receiver using symbol-by-symbol decoding.

12. An apparatus for transmitting, the apparatus comprising:
an encoder configured to receive a set of four interleaved symbols corresponding to a set of four symbols that represent data;
a module coupled to the encoder and configured to arrange the set of four interleaved symbols in a matrix; and
a transmitter coupled to the encoder and the module, wherein contents of the matrix control transmission of the data by transmitting the set of four interleaved symbols using a plurality of transmit antennas, wherein two transmit antennas of the plurality of transmit antennas transmit a first combination of information of the set of four interleaved symbols over a first transmission sub-carrier channel and a second combination of the set of four interleaved symbols over a second transmission sub-carrier channel, wherein each transmitter antenna of the plurality of transmitter antennas transmits over at least two transmission channels; wherein
each interleaved symbol of the set of four interleaved symbols is generated by combining a first part of a first symbol with a second part of a second symbol, a replication of a conjugate of each interleaved symbol and a negative complex conjugate of each interleaved symbol; and wherein
the first part is a real part of the symbol and the second part is an imaginary part of the other symbol.

13. The apparatus of claim 12, wherein the set of four symbols includes the first and second symbols.

14. The apparatus of claim 12, wherein the matrix includes at least three rows and four columns, each row of the matrix corresponding to a transmitter antenna.

15. The apparatus of claim 12, wherein the matrix comprises:
a first row with a first two interleaved symbols from the set of four interleaved symbols in a first two columns of the matrix and zeros in a last two columns of the matrix;
a second row with a complex conjugate and a negative complex conjugate of the first two interleaved symbols from the set of four interleaved symbols in the first two columns of the matrix and second two interleaved symbols from the set of four interleaved symbols in the last two columns of the matrix; and
a third row with zero in the first two columns of the matrix and a complex conjugate and a negative complex conjugate of the second two interleaved symbols in the second two columns of the matrix, the first two columns representing the first transmission sub-carrier channel and the last two columns representing the second transmission sub-carrier channel.

16. The apparatus of claim 15, wherein the matrix further comprises a fourth row representing a fourth transmitter antenna being used in a predetermined manner to transmit the set of four interleaved symbols.

17. The apparatus of claim 12, wherein the set of four symbols includes values from at least one constellation.

18. The apparatus of claim 17, further comprising rotating the constellation to form a rotated constellation when at least one of a real and an imaginary part of one symbol from the constellation is the same as at least one of a real and imaginary part of another symbol in the constellation.

19. The apparatus of claim 12, wherein the matrix comprises:
a first row with a first two interleaved symbols from the set of four interleaved symbols in a first two columns of the matrix and zeros in a last two columns of the matrix;
a second row with a complex conjugate and a negative complex conjugate of the first two interleaved symbols from the set of four interleaved symbols in the first two columns of the matrix and zeroes in the last two columns of the matrix;
a third row with zero in the first two columns of the matrix and third and fourth interleaved symbols in the second two columns of the matrix, the first two columns of the matrix representing the first transmission sub-carrier channel and the last two columns of the matrix representing the second transmission sub-carrier channel.

20. The apparatus of claim 19, wherein the matrix further comprises:
a fourth row representing a fourth transmitter antenna being used in a predetermined manner to transmit the set of four interleaved symbols.

21. The apparatus of claim 12, wherein the transmitter controls transmission using a power weighting on the plurality of transmit antennas, wherein the power weighting provides relatively higher power on a third antenna compared to a first two antennas.

22. The apparatus of claim 12, wherein the set of four interleaved symbols can be decoded at a receiver using a symbol-by-symbol decoding technique.

23. The apparatus of claim 12, wherein an orthogonal scrambling matrix is used to mix output symbols to the plurality of antennas, wherein a peak-to-average ratio of signals is reduced at the plurality of antennas.

24. The apparatus of claim 12, wherein the orthogonal scrambling matrix is a 4×4 Hadamard matrix.

25. A system comprising:
an encoding module configured to receive at least one set of four symbols from a set of symbols;
an interleaving module coupled to the encoding module and configured to interleave each symbol from the set of four symbols with a corresponding combining symbol to obtain a set of four interleaved symbols corresponding to the set of four symbols; and
a transmitter coupled to the encoding module and the interleaving module and configured to transmit the set of four interleaved symbols using a plurality of transmit antennas, wherein at least two transmit antennas of the plurality of transmit antennas transmit a first combination of the set of four interleaved symbols over a first transmission channel and a second combination of the set of four interleaved symbols over a second transmission channel, wherein each transmitter antenna of the plurality of transmitter antennas transmitting over at least two transmission channels; wherein the set of four symbols includes values from at least one constellation; and
further comprising rotating the constellation to form a rotated constellation when at least one of a real and imaginary part of one symbol from the constellation is the same as at least one of a real and imaginary part of another symbol in the constellation.

26. The system of claim 25, wherein the first combination of information includes a combination of a first two interleaved symbols, a complex conjugate of the first two interleaved symbols and a negative complex conjugate of the first two interleaved symbols from the set of four interleaved symbols.

27. The system of claim 25, wherein the second combination of information includes a combination of a second two interleaved symbols, a complex conjugate of the second two interleaved symbols and a negative complex conjugate of the second two interleaved symbols from the set of four interleaved symbols.

28. The system of claim 25, wherein each symbol of the set of symbols is represented in a different manner from each other symbol of the set of symbols.

29. The system of claim 25, wherein each interleaved symbol from the set of four interleaved symbols comprises information of the symbol and the corresponding combining symbol, wherein the set of four symbols includes the symbol and the corresponding combining symbol.

30. The system of claim 25, further comprising a rotating module that rotates a constellation by a predetermined angle when at least one of a real and imaginary part of one symbol from the constellation is equal to at least one of a real and imaginary part of another symbol form the constellation.

31. The system of claim 25, wherein the encoding module and the transmitting module are integrated as a single module.

32. The system of claim 31, wherein the single module can be a component of at least one of a base station and a subscriber station.

33. The system of claim 31, wherein the single module is a processor-based module.

34. The system of claim 25, wherein the encoding module and the transmitting module are configured to transmit the set of four interleaved symbols using an additional transmitter antenna in a predetermined manner.

35. The system of claim 25, wherein the at least one set of four symbols are transmitted over a wireless medium.

36. The system of claim 25, wherein the set of four interleaved symbols are transmitted by switching between the plurality of transmitter antennas in a cyclic manner such that each transmit antenna transmits a substantially equal number of interleaved symbols over at least one time period, each transmitter antenna using a substantially equal amount of power over the time period.

37. A method comprising:
selecting a set of four symbols from a set of symbols that represent data;
encoding a set of four interleaved symbols that represent the set of four symbols, each interleaved symbol from the set of four interleaved symbols being generated by combining a first part of one symbol with a second part of one other symbol; and transmitting the encoded set of four interleaved symbols using a plurality of transmit antennas, wherein two transmit antennas of the plurality of transmit antennas transmit a first combination of the set of four interleaved symbols over a first transmission sub-carrier channel and a second combination of the set of four interleaved symbols over a second transmission sub-carrier channel, wherein each transmitter antenna of the plurality of transmitter antennas transmits over at least two transmission channels; wherein
each interleaved symbol of the set of four interleaved symbols is generated by combining a first part of a first symbol with a second part of a second symbol, a replication of a conjugate of each interleaved symbol and a negative complex conjugate of each interleaved symbol; and wherein
the first part is a real part of the symbol and the second part is an imaginary part of the other symbol.

38. An apparatus for transmitting, the apparatus comprising:
an encoder configured to receive a set of four interleaved symbols corresponding to a set of four symbols that represent data;
a module coupled to the encoder and configured to arrange the set of four interleaved symbols in a matrix; and
a transmitter coupled to the encoder and the module, wherein contents of the matrix control transmission of the data by transmitting the set of four interleaved symbols using a plurality of transmit antennas, wherein two transmit antennas of the plurality of transmit antennas transmit a first combination of information of the set of four interleaved symbols over a first transmission sub-carrier channel and a second combination of the set of four interleaved symbols over a second transmission sub-carrier channel, wherein each transmitter antenna of the plurality of transmitter antennas transmits over at least two transmission channels; wherein the matrix comprises:
a first row with a first two interleaved symbols from the set of four interleaved symbols in a first two columns of the matrix and zeros in a last two columns of the matrix;
a second row with a complex conjugate and a negative complex conjugate of the first two interleaved symbols from the set of four interleaved symbols in the first two columns of the matrix and second two interleaved symbols from the set of four interleaved symbols in the last two columns of the matrix; and
a third row with zero in the first two columns of the matrix and a complex conjugate and a negative complex conjugate of the second two interleaved symbols in the second two columns of the matrix, the first two columns representing the first transmission sub-carrier channel and the last two columns representing the second transmission sub-carrier channel.

39. An apparatus for transmitting, the apparatus comprising:
an encoder configured to receive a set of four interleaved symbols corresponding to a set of four symbols that represent data;
a module coupled to the encoder and configured to arrange the set of four interleaved symbols in a matrix; and
a transmitter coupled to the encoder and the module, wherein contents of the matrix control transmission of the data by transmitting the set of four interleaved symbols using a plurality of transmit antennas, wherein two transmit antennas of the plurality of transmit antennas transmit a first combination of information of the set of four interleaved symbols over a first transmission sub-carrier channel and a second combination of the set of four interleaved symbols over a second transmission subcarrier channel, wherein each transmitter antenna of the plurality of transmitter antennas transmits over at least two transmission channels; wherein
the set of four symbols includes values from at least one constellation; and
further comprising rotating the constellation to form a rotated constellation when at least one of a real and an imaginary part of one symbol from the constellation is the same as at least one of a real and imaginary part of another symbol in the constellation.

40. An apparatus for transmitting, the apparatus comprising:
an encoder configured to receive a set of four interleaved symbols corresponding to a set of four symbols that represent data;
a module coupled to the encoder and configured to arrange the set of four interleaved symbols in a matrix; and
a transmitter coupled to the encoder and the module, wherein contents of the matrix control transmission of the data by transmitting the set of four interleaved symbols using a plurality of transmit antennas, wherein two transmit antennas of the plurality of transmit antennas transmit a first combination of information of the set of four interleaved symbols over a first transmission sub-carrier channel and a second combination of the set of four interleaved symbols over a second transmission sub-carrier channel, wherein each transmitter antenna of the plurality of transmitter antennas transmits over at least two transmission channels; wherein the matrix comprises:

a first row with a first two interleaved symbols from the set of four interleaved symbols in a first two columns of the matrix and zeros in a last two columns of the matrix;

a second row with a complex conjugate and a negative complex conjugate of the first two interleaved symbols from the set of four interleaved symbols in the first two columns of the matrix and zeroes in the last two columns of the matrix;

a third row with zero in the first two columns of the matrix and third and fourth interleaved symbols in the second two columns of the matrix, the first two columns of the matrix representing the first transmission sub-carrier channel and the last two columns of the matrix representing the second transmission sub-carrier channel.

41. The apparatus of claim 40, wherein the matrix further comprises:

a fourth row representing a fourth transmitter antenna being used in a predetermined manner to transmit the set of four interleaved symbols.

42. A system comprising:

an encoding module configured to receive at least one set of four symbols from a set of symbols;

an interleaving module coupled to the encoding module and configured to interleave each symbol from the set of four symbols with a corresponding combining symbol to obtain a set of four interleaved symbols corresponding to the set of four symbols; and a transmitter coupled to the encoding module and the interleaving module and configured to transmit the set of four interleaved symbols using a plurality of transmit antennas, wherein at least two transmit antennas of the plurality of transmit antennas transmit a first combination of the set of four interleaved symbols over a first transmission channel and a second combination of the set of four interleaved symbols over a second transmission channel, wherein each transmitter antenna of the plurality of transmitter antennas transmitting over at least two transmission channels; wherein each interleaved symbol of the set of four interleaved symbols is generated by combining a first part of a first symbol with a second part of a second symbol, a replication of a conjugate of each interleaved symbol and a negative complex conjugate of each interleaved symbol; and wherein the first part is a real part of the symbol and the second part is an imaginary part of the other symbol.

* * * * *